Figure 1:
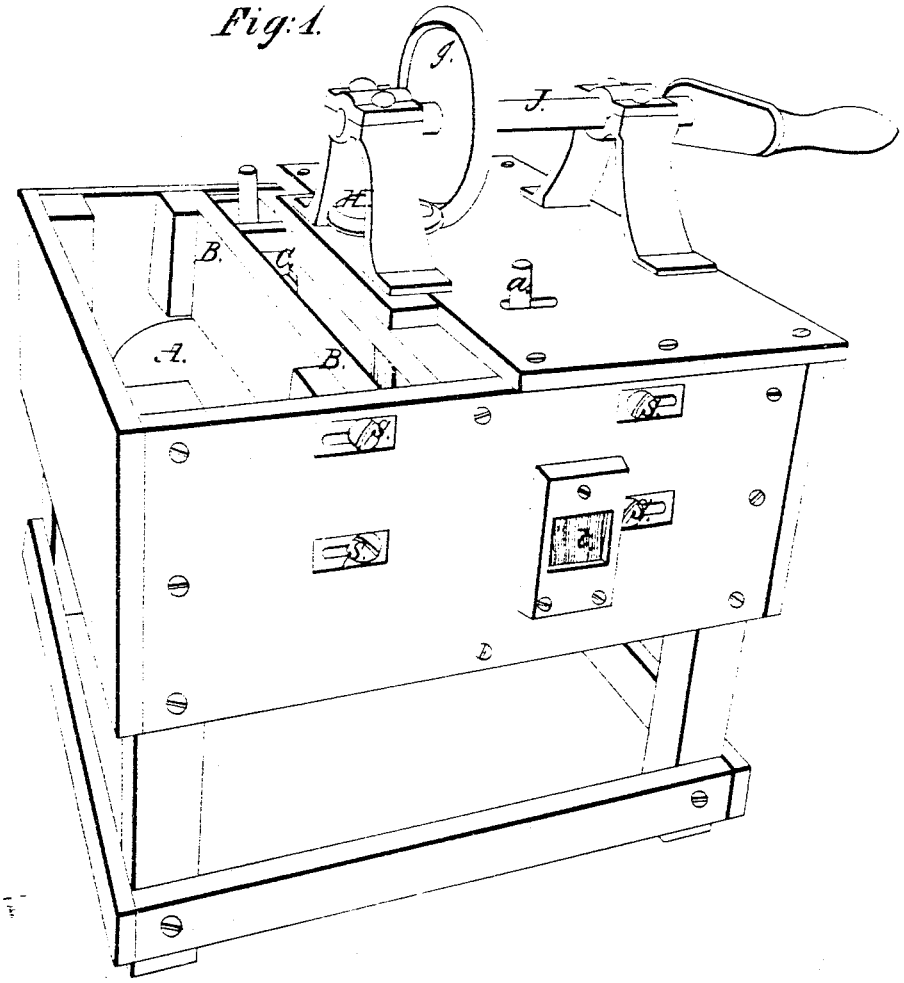
Figure 3:
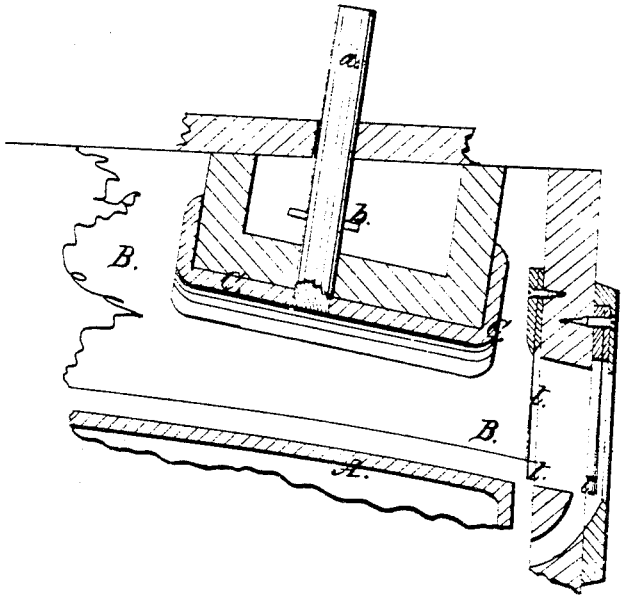
Figure 2:
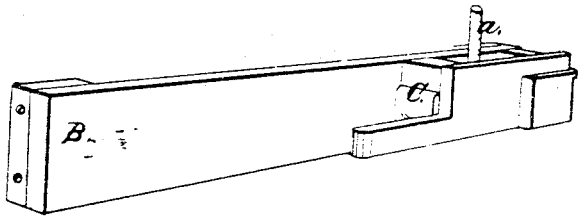

BEST AVAILABLE COPY

Sheet 1 - 2 Sheets.

W. Wells.

NO PRINTED SPECIFICATION AVAILABLE

Corn Sheller.

No 232. A.I. Patented Nov. 26, 1859.

Witnesses.
Wm. S. Crosby.
J. B. Crosby

Inventor
William Wells

TX 460/45

BEST AVAILABLE COPY

Sheet 2 - 2 Sheets.

W. Wells.

Corn Sheller.

No. 232. A. I. Patented Apr. 26, 1859.

Witnesses.
Wm. S. Crosby
J. B. Crosby

Inventor.
William Wells

N. PETERS PHOTO-LITHOGRAPHER WASHINGTON D. C.